No. 780,169. PATENTED JAN. 17, 1905.
H. C. HANSEN.
CLUTCH MECHANISM.
APPLICATION FILED MAY 8, 1903.
3 SHEETS—SHEET 1.
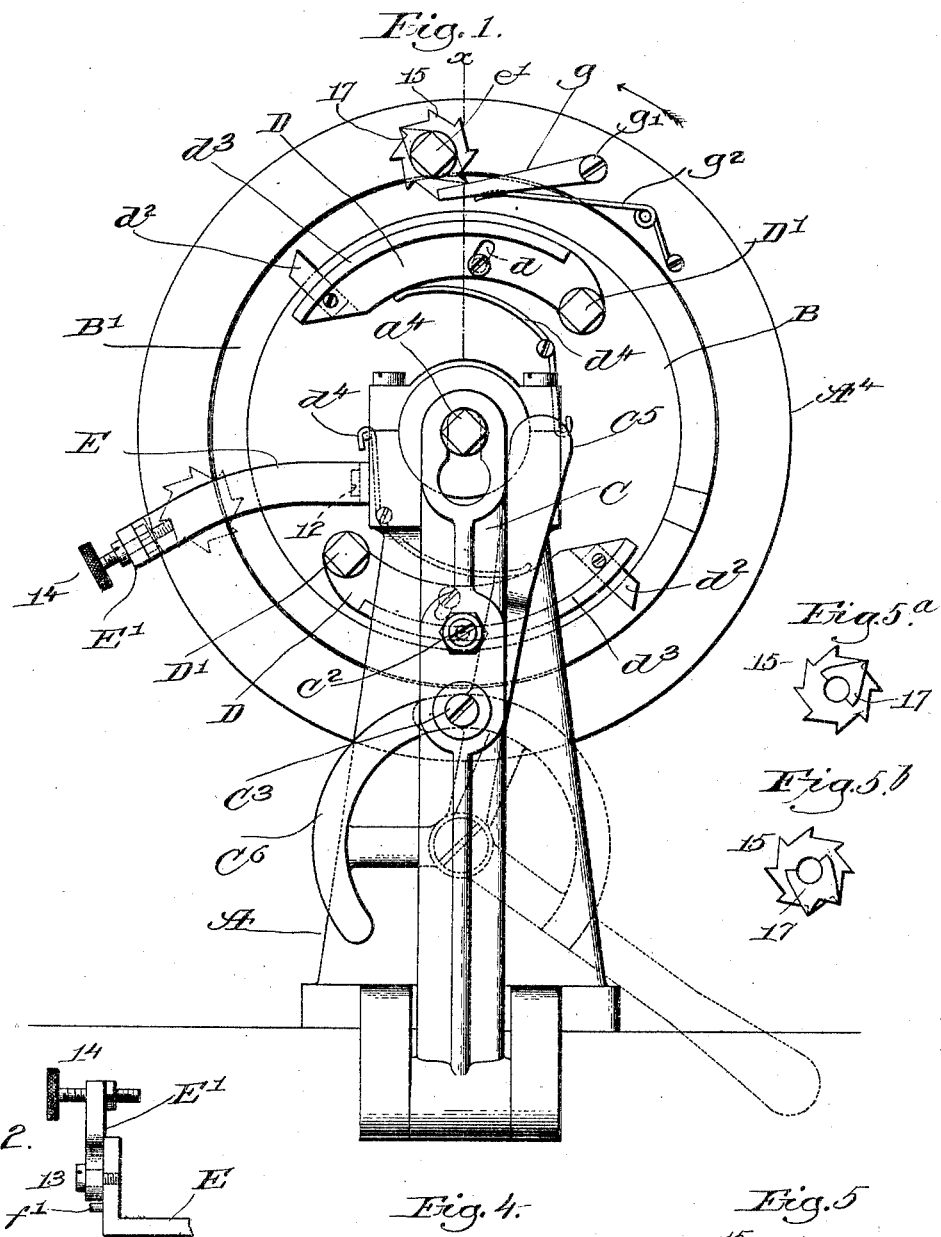
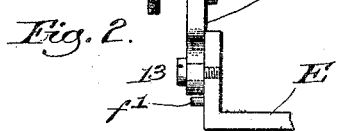
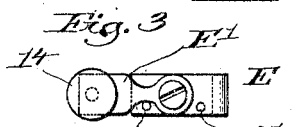
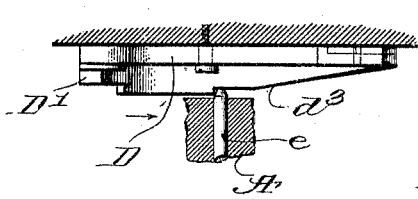
Witnesses:
Fred S. Greenleaf
W. C. Lunsford
Inventor,
Hans C. Hansen,
by Crosby & Gregory
Attys.

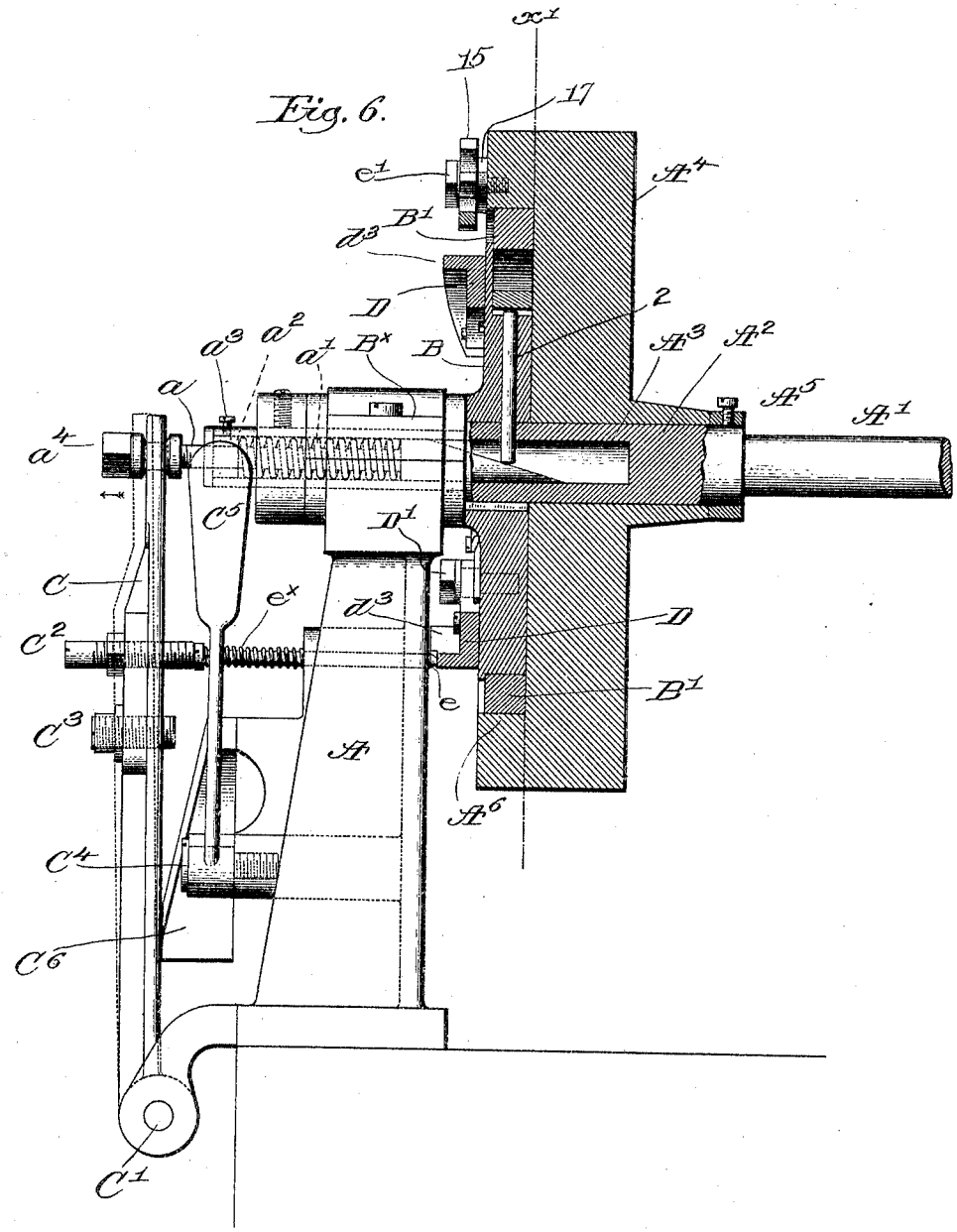

No. 780,169.

Patented January 17, 1905.

UNITED STATES PATENT OFFICE.

HANS C. HANSEN, OF NEWTON, MASSACHUSETTS.

CLUTCH MECHANISM.

SPECIFICATION forming part of Letters Patent No. 780,169, dated January 17, 1905.

Application filed May 8, 1903. Serial No. 156,183.

*To all whom it may concern:*

Be it known that I, HANS C. HANSEN, a citizen of the United States, residing at Newton, in the county of Middlesex and State of Massachusetts, have invented an Improvement in Clutch Mechanism, of which the following description, in connection with the accompanying drawings, is a specification, like characters on the drawings representing like parts.

This invention has for its object the production of a novel clutch mechanism by which a shaft may be turned for any part of a full rotation and be then arrested temporarily for any period of time less than the time of a full rotation of the continuously-running pulley which is employed to drive said shaft intermittingly.

One part of my invention comprises a shaft having a continuously-driven loose pulley, a clutch, and means to control the action of the clutch that it may be made to engage the loose pulley and rotate the shaft intermittingly at predetermined intervals for any number of degrees less than a full rotation of said shaft.

Figure 7:
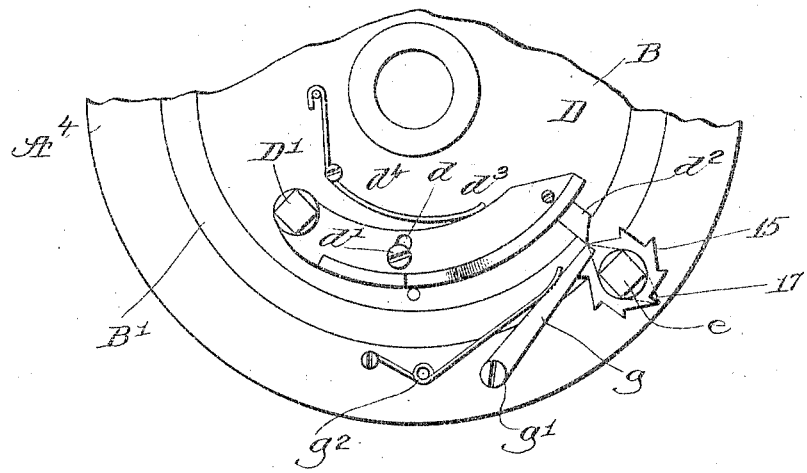
Figure 8:
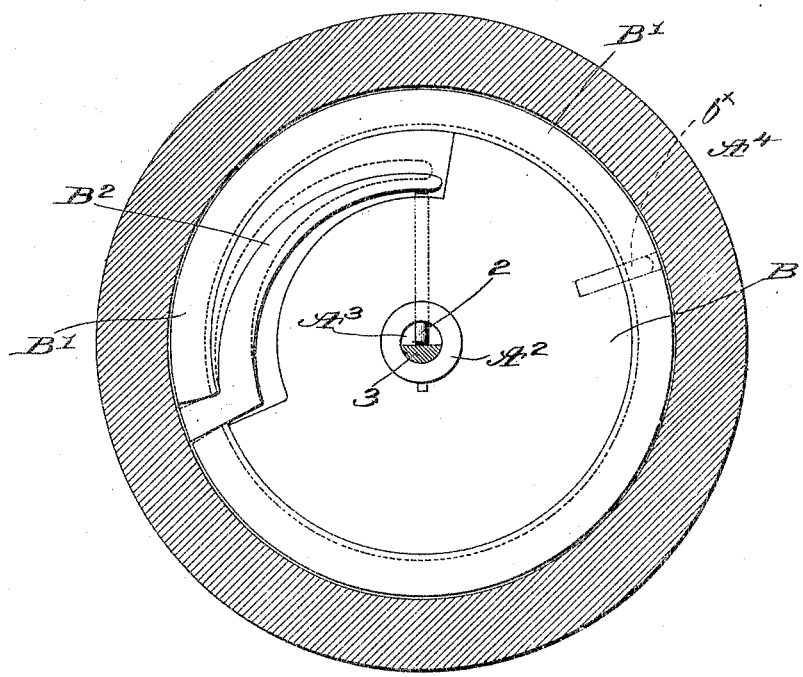

Figure 1 is an end view of a clutch mechanism embodying my invention in one good form; Fig. 2, a detail showing detached the stand and means carried by it for rotating a ratchet to be described; Fig. 3, a left-hand side view of the parts shown in Fig. 2; Fig. 4, a detail showing part of the disk, one of its cams, and a pin moved by it; Fig. 5, a rear side view of a ratchet-wheel having a stop-indicator shaped to stop the shaft twice in each full rotation; Figs. $5^a$ and $5^b$, modified forms of starting-cams to be described. Fig. 6 is a section in the line $x$, Fig. 1; Fig. 7, a detail showing a portion of the loose pulley, the disk and cam, and interposed clutch device. Fig. 8 is a section to the right of the dotted line $x'$.

In the drawings, A designates a bearing-stand forming part of a suitable support for a shaft A', that is to be rotated intermittingly to move said part of a machine at intervals—as, for instance, a mold of a type-casting machine.

The shaft A' has one end enlarged, as at $A^2$, and bored to constitute a chamber $A^3$. The shaft is surrounded by a loose pulley $A^4$, that in practice may be driven continuously by a belt deriving its motion from any usual counter-shaft. (Not shown.) One end of the pulley abuts a collar $A^5$ on the shaft.

The loose pulley is shown as chambered at its outer side to leave a flange $A^6$, the inner side of which is circular.

The enlarged end of the shaft A' is embraced next the outer face of the loose pulley by a disk B, suitably fixed to the shaft, as by a key $b$. The particular shape of the disk is best shown in section, Fig. 6, and in elevation, Fig. 8, where the inner side of said disk is illustrated. The hub $B^\times$ of the disk enters (see dotted lines, Fig. 6) and is extended through the bearing at the top of the stand A.

The disk B is embraced by a split ring B', that is loosely connected therewith by a stud $b^\times$. (Shown by dotted lines.) The ring B' is cut away (see Fig. 8) to receive a lever $B^2$, the outer end of which enters a space between the free ends of the split ring. The inner end of the lever rests on a pin 2, free to be slid radially in a hole in said disk. The split ring and lever constitute one well-known form of clutch device intermediate the disk and its shaft and the pulley $A^4$. The inner end of pin 2 enters the chamber $A^3$ of the shaft A' and rests on a wedge 3, occupying a position therein. The wedge is carried by a slide-rod $a$, surrounded by a spring $a'$, one end of which abuts a part of the wedge and the other end a collar $a^2$, entering the outer end of the hollow hub $B^\times$ of the disk, where it is held by a set-screw $a^3$. The rod $a$ is provided at its outer end with a nut $a^4$, having an annular groove that is entered by a portion of the upper end of wedge-withdrawing means, shown as a lever C, pivoted at C' on an ear extended from the stand A. The lever, as herein shown, has an opening (see Fig. 1) contracted at its upper end, and the inner walls of the contracted parts of the opening engage the annular groove, and as the lever C is moved outwardly in the direction of the arrow, Fig. 6, as will be described, the lever draws the wedge outwardly in the same direction against and compressing the spring $a'$, thus enabling the pin to descend under the action of the lever or dog B², the lever in the position shown in Figs. 6 and 8 being in its inoperative position, the clutch being disengaged, and the pulley A⁴ running loose on the then stationary shaft. The spring $a'$ acts normally to move the wedge into the space A³, open the clutch-ring, and couple the loose pulley to the shaft.

The lever C has an adjustable screw C², that contacts with a headed pin $e$, inserted loosely in the stand A and surrounded by a spring $e^×$ and an adjustable stop C³. The stand has a stud C⁴, on which is mounted a hand-lever C⁵, having a cam-shaped hub C⁶, that may be turned from its full into the dotted line position, Fig. 1, when it is desired to lock the lever C in a position to free the pulley from the shaft.

The outer face of the disk B is provided with one or more arms D, loosely pivoted on stud-screws D′ and having slots $d$ to receive each a screw $d'$. Each arm has at its outer end a dog $d^2$ and an outturned flange $d^3$, made as a cam, as shown best in Figs. 4 and 6.

Each of the arms D occupy normally a position (see Fig. 1) with its free end moved outwardly under the spring $d^4$ and the inner end of the slot $d$ in contact with the screw $d'$. In the rotation of the disk B by the pulley A⁴ as each arm arrives opposite the end of the pin $e$ the cam-shaped flange $d^3$ of arm D meets said pin and pushes it outwardly, causing the pin to act against the screw C² and move the lever C in the direction to withdraw the wedge 3, release the pin 2, and let the lever B² move to permit the clutch to contract and free the pulley A⁴, so that it may run loosely about the shaft A². So long as an arm D occupies a position with its flange in contact with the pin $e$, as described, so long the shaft will remain at rest. To enable the clutch to engage the loose pulley and start the shaft, I have provided the pulley with a stud $e'$, on which I have mounted loosely a wheel 15, having a series of teeth, the wheel shown having eight teeth; but the number of teeth may be varied according to the number of rotations it is desired that the pulley A² may make in rotating the ratchet-wheel once.

To rotate the wheel 15, the stand A has connected with it by a screw 12 a bracket E, having a stud-screw 13, on which is pivoted an arm E′, provided with an adjustable pawl 14, shown as a screw that is struck by a tooth of said ratchet-wheel 15 during each rotation of the loose pulley A⁴. As each tooth meets said pawl the ratchet-wheel is turned partially, and the ratchet-wheel shown will be fully rotated during eight rotations of said loose pulley. The arm E′ in its operative position is sustained by a stud $f$; but it may be turned into its inoperative position and be sustained by a stud $f'$.

The toothed wheel 15 is acted upon by a detent $g$, pivoted on a stud $g'$, carried by loose pulley A⁴ and acted upon by a spring $g^2$. The ratchet-wheel has at its inner side starting means 17, which may present a plurality of operative points, as shown in Figs. 5 and 5ᵇ, or one operative point, as shown in Fig. 5ᵃ, or, in fact, any desired number of such points, less, however, in number than the number of ratchet-teeth. The points on the starting device may vary in number and position with relation to each other according to the time at which the shaft is to be started and to the extent of the rotative movement it is desired to impart to the shaft, which may be a full rotation or any part of a rotation, as will be described.

The ratchet-wheel (shown in Figs. 1 and 5) has eight teeth and the starting means 17 two operative points. In describing the operation of the apparatus I will assume that but one arm D is used; but it will be borne in mind that I may use two or any number of arms D that the disk B, keyed to the shaft, will carry and that the shape of the cam-faces of the ledges of the arms may be varied without departing from my invention. If but one arm D is used, the pulley will rotate loosely three times about the shaft, and at the fourth rotation one of the operative points of the starting means will meet the dog $d^2$ and move inwardly the outer end of the arm D, thereby removing the flange $d^3$ from the end of the spring-pressed pin $e$, and immediately the spring $a'$ is permitted to act and slide the wedge $a$ into the shaft, thus forcing outwardly the pin 2 and moving the lever B² to cause the ring B′ to immediately clutch the traveling loose pulley A⁴ and take the shaft with it for one rotation, at which time the said arm D would again meet and move outwardly the pin $e$ and again effect the release of the loose pulley. If the starting means had but one operative point, (see Fig. 5ᵃ,) then the pulley would be free to be rotated loosely on the shaft seven times and be coupled with and to rotate the shaft at the eighth rotation of the pulley.

If the starting means had but one operative point, as shown in Fig. 5ᵃ, and two arms D were employed, then the pulley might rotate seven and one-half times loosely about the shaft, and at the end of such revolutions the point would move one of the arms and effect the engagement of the clutch, so that the pulley would turn the shaft a half-rotation, at which time the arm D would come into position and effect the disengagement of the clutch, as described, from the pulley. The pulley would then again rotate seven and a half times, leaving the shaft at rest, and thereafter the arm D which was moved to effect the release of the clutch at the previous time would be again released, letting the clutch come into engagement with the pulley to rotate the shaft a half-revolution. It will thus be understood that an excess in the number of teeth of the ratchet-wheel over the number of points of the starting means provides for the number of free rotations of the pulley about the shaft between the operations of the points to effect the clutching of the loose pulley on the shaft to start the latter.

Now with the particular ratchet-wheel and starting-point shown in Fig. 5 and two arms D the pulley will rotate three and a half times loosely about the shaft, and then an arm D will be again moved to enable the pulley to be engaged with and carry the shaft a half-rotation. Consequently it will be understood that I may provide the ratchet with any desired number of teeth and the starting means with any desired number of operating-points and that I may also provide the disk B with any desired number of arms D, and according to the numbers of teeth, points, and arms I may rotate the pulley loosely any desired number of times and pick up the shaft and rotate it once, or for a half-rotation, or for a quarter-rotation, or for any increment of a rotation at will, or I may rotate the shaft for a small portion of a rotation less than one hundred and eighty degrees while the loose pulley is clutched thereto, and at the next succeeding operation I may rotate the shaft for more than a half-rotation or for whatever difference there exists between the first partial rotation and the second partial movement to complete a full rotation, or, in other words, by the mechanism described and using more or less arms, teeth, and points I may effect the rotation of the shaft A' for any portion of a rotation greater or less than a full rotation and follow it with a greater or less rotation.

Viewing Fig. 5, it will be seen that the operative points of the starting means are opposite; but should said points be arranged, as shown in Fig. 5$^b$, so that the points would both act in a quarter-turn of the ratchet-wheel it would follow that the pulley would be rotated about the shaft for between five and six rotations, and then one of the points would effect the clutching of the pulley to the shaft and rotate it, say, a quarter-turn, and thereafter the pulley would be released for, say, one and a fraction of a rotation, and then the second point would effect the clutching of the pulley to the shaft and would rotate the shaft for less than a full rotation—say three-quarters—and thereafter the pulley would again be run loosely about the shaft for between five and six rotations, as stated.

Having described my invention, what I claim as new, and desire to secure by Letters Patent, is—

1. In apparatus of the class described, a shaft chambered at its end, a pulley loose on said shaft; a clutch device comprising a disk, a hollow hub keyed to said shaft, a split ring, a lever and a pin; means including a spring-controlled wedge to cause said clutch device to be engaged with and rotated by said pulley; a cam-arm carried by the disk of the clutch device, a lever connected with said wedge, a device carried by the loose pulley to maintain said cam-arm in its inoperative position and to release the same at a predetermined time in the rotation of the clutch device, and means intermediate said cam-arm and lever when said cam-arm is in its operative position to withdraw said wedge against its spring and release the clutch device.

2. In apparatus of the class described, a shaft chambered at its end, a clutch device fixed on said shaft, a pulley surrounding said shaft loosely, a wedge in said chamber, a lever connected with said wedge, a cam-arm rotatable with the shaft, and means interposed between said arm and said lever to move the latter to free the loose pulley from the shaft.

3. In apparatus of the class described, a hollow shaft, a pulley loose on said shaft and adapted to be rotated continuously, a clutch device fast on said shaft, a wedge located in said hollow shaft, a spring to move said wedge automatically to effect the engagement of the clutch with said pulley, a lever connected with said wedge, and means carried by said clutch and pulley to impart outward movement at a predetermined time to said wedge to thereby disconnect the clutch from said pulley and let the spring assume control of said wedge to again close the clutch to engage the pulley and again start the shaft in rotation.

4. In an apparatus of the class described, a shaft, a loose pulley thereon adapted to be rotated continuously, a clutch having an arm provided with a cam, a device actuated by said arm to free the loose pulley and enable the same to revolve about the shaft for a plurality of times, a device carried by said loose pulley to turn said arm to effect automatically the coupling of the loose pulley with and to rotate the shaft for less than a full rotation, and means to turn intermittingly a device carried by said loose pulley to move automatically said arm when the pulley is to run loosely on said shaft.

5. In apparatus of the class described, a shaft, a clutch fixed to said shaft, a spring-controlled wedge, a pivoted arm having a cam, a lever connected with said wedge, means intermediate said arm and lever to move said lever, withdraw said wedge and hold it withdrawn, and means to actuate said arm at a predetermined time in the rotation of the shaft to release said lever that the spring coacting with the wedge may move the lever.

In testimony whereof I have signed my name to this specification in the presence of two subscribing witnesses.

HANS C. HANSEN.

Witnesses:
GEO. W. GREGORY,
EDITH M. STODDARD.